April 26, 1932.  N. R. BUDGE  1,855,664
LEVEL
Filed Sept. 5, 1929   2 Sheets-Sheet 1

Inventor
N. R. Budge
By Watson E. Coleman
Attorney

April 26, 1932.   N. R. BUDGE   1,855,664
LEVEL
Filed Sept. 5, 1929   2 Sheets-Sheet 2
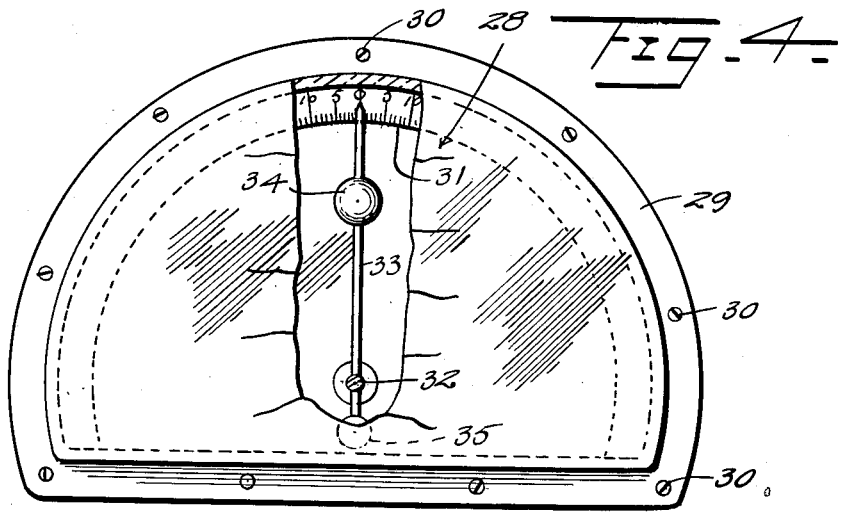
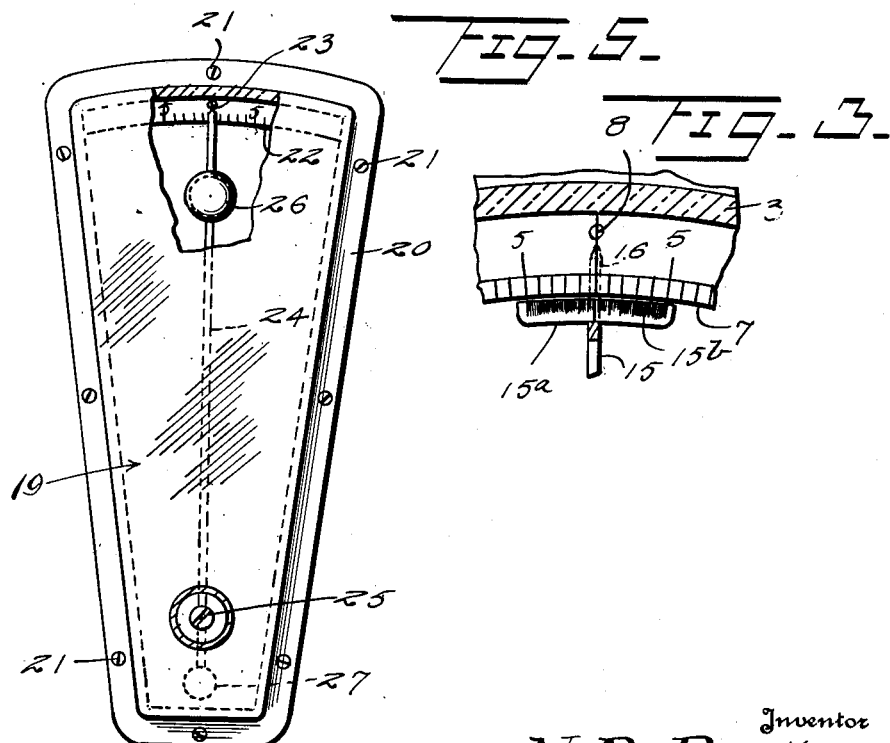
Inventor
N. R. Budge
By Watson E. Coleman
Attorney Patented Apr. 26, 1932

1,855,664

UNITED STATES PATENT OFFICE

NEWELL R. BUDGE, OF PARIS, IDAHO

LEVEL

Application filed September 5, 1929. Serial No. 390,581.

This invention relates to improvements in leveling instruments and pertains particularly to a level having an oscillatable pointer operating in conjunction with a scale.

The primary object of the present invention is to provide a level for the use of carpenters or other workmen and surveyors, which will give accurate results under all conditions as it is designed to be free from the influence of cold or temperature changes and ore deposits.

The invention broadly contemplates the provision of a casing preferably constructed of a transparent material, such as glass, in which is a scale of circular formation and graduated in degrees of a circle. At the radial center of the scale, between the walls of the casing, is a shaft which carries a pointer, each end of which is bifurcated to receive the inner edge of the circular scale which is carried by the casing, each of the furcations at each end of the pointer overlying one face of the scale. The pointer adjacent one end is weighted so that it will normally assume a perpendicular position.

The invention will be best understood from a consideration of the following detailed description taken in connection with the accompanying drawings forming a part the present invention with the understanding, however, that the invention is not confined to any strict conformity with the showing of the drawings but may be changed or modified so long as such changes or modifications mark no material departure from the salient features of the drawings as expressed in the appended claims.

In the drawings:—

Figure 3 is an enlarged detail view of one end of a pointer showing the vernier device thereon.

Figure 4 is a view in side elevation of a modified form of the level.

Figure 5 is a view in side elevation of a further modified form of the level.

Figure 1:
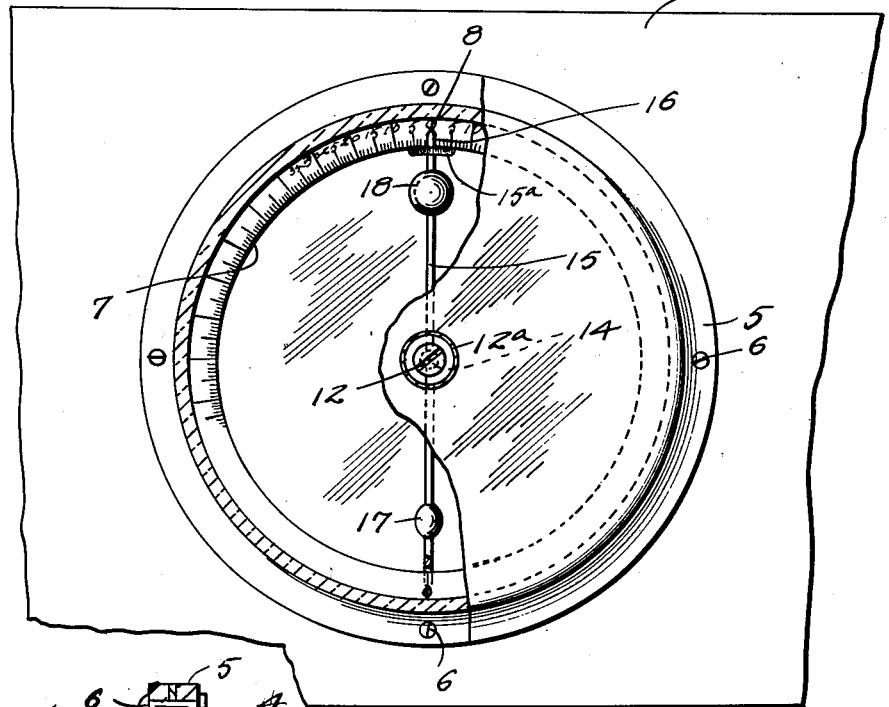
Figure 1 is a plan view of the preferred form of the present invention showing the same applied.
Figure 2:
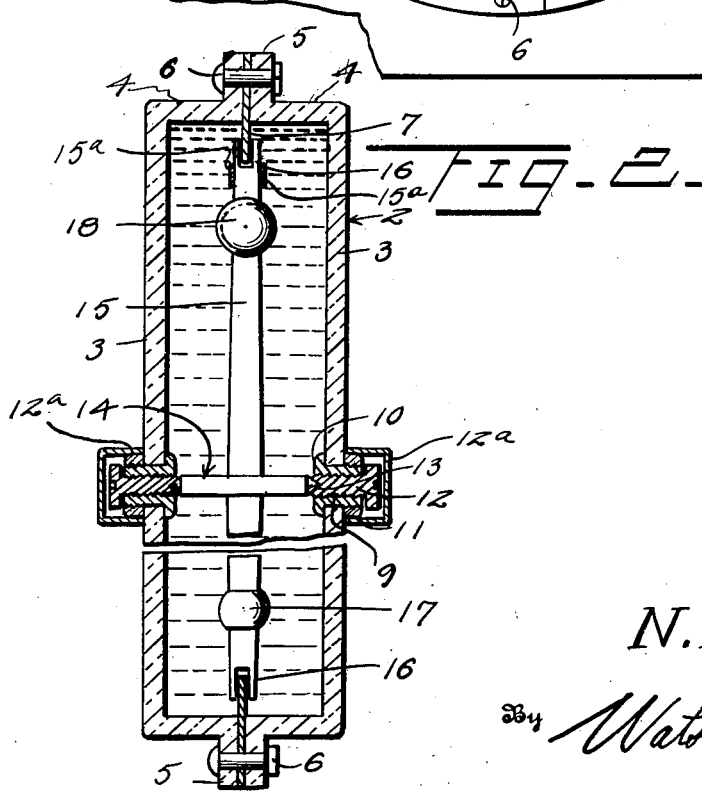
Figure 2 is a transverse sectional view of the level, per se.

Referring to the drawings in detail Figures 1 and 2 show a form of the present level device designed for use upon such instruments as carpenters levels and the like, a portion of the body of such an instrument being indicated by the numeral 1. The level device comprises a circular casing preferably constructed of glass and indicated generally by the numeral 2. This casing is formed in two sections, each section consisting of a disk 3 having the lateral walls 4 each of which terminates in a surrounding outwardly extending flange 5. Each of the flanges is provided with suitable apertures which when brought into alignment by bringing the flanges together are designed to receive coupling bolts or screws 6.

Within the casing 2 there is positioned a flat annular scale plate 7, the overall diameter of which is substantially equal to the overall diameter of the abutting flanges 5 of the casing, while the inside diameter of this scale is materially less than the interior diameter of the casing 2. When the two sections of the casing 2 are brought together, the scale disk is positioned between the flanges 5 and securing bolts 6 passed therethrough so that the scale will be securely held in position and a portion thereof will extend into the casing from the walls 4, in the manner shown in Figures 1 and 2. Each face of the scale plate 7 is graduated in degrees of a circle and the casing so positioned that the diametrically opposite zero points 8 will be adjacent the straight edges of the body 1 when the leveling device is in position therein.

The radial center of each of the disks 3 of the casing is provided with an aperture to receive a sleeve 9 at one end of which is formed a head 10 which is adapted to abut the inner face of the disk to limit its movement therethrough when drawn to position by a nut 11 which is threaded upon a threaded outer end thereof.

The sleeves 9 are interiorly threaded to receive the threaded bearing screws 12, the inner end of each of which screws is provided with a conical bearing recess 13, the outer end of these screws being headed and provided with a kerf for the reception of the driving point of a screw driver or similar instrument which may be used to adjust the relative positions of the bearings.

Within the casing 2 there is mounted between the bearings 12 the transverse shaft 14 which supports a pointer 15. The ends of this shaft are tapered to extend into the recessed ends of the bearing screws, in the manner shown.

The shaft 14 engages the pointer substantially midway between its ends and each end of the pointer is bifurcated, as shown, to receive the inner edge of the scale plate 7, each of the furcations 16 overlying one graduated face thereof.

The pointer 15 is provided adjacent one end with a weight body 17 and adjacent the other end with an air chamber 18.

When in use the casing 2 is preferably filled with a suitable non-freezing liquid such as alcohol which will dampen the movement of the pointer to a certain extent so that unnecessary oscillations thereof will be avoided when the device is in use and in order to prevent the instrument being affected by magnetic influences the pointer is preferably constructed of a non-magnetic metal, such as aluminum.

The joints between the contacting surfaces of the flanges 5 with the scale plate 7 and the joints between the contacting faces of the sleeves 9 and disks 3 are preferably fluid tight so that the liquid placed in the casing will not leak therefrom.

At the end of the pointer 15 adjacent the air chamber 18 an arcuate fractional scale plate 15$^a$ is mounted, the edge of this plate adjacent the scale plate 7 having one degree division marks, the area between the same being marked off in tenths of a degree, as indicated at 15$^b$. With this arrangement the degree of oscillation of the pointer 15 can be more accurately determined for if the pointer stops between two degree marks on the scale plate 7, the frictional scale will assist the user in determining the exact position of the pointer between the main scale markings. For example, if the center line on the pointer 15 swings over to the right of the zero point on scale 7 two full degrees and stops between the second and third degree marks, the number of tenths of a degree which the pointer has moved beyond the second degree mark may be determined by counting back on the fractional scale plate the number of tenth degree marks between the pointer center line and the second degree mark on the scale 7.

In Figures 4 and 5, there are shown two modified forms of the level previously described, the form shown in Figure 5 being designed particularly for the use of surveyors. In this type of level, the casing which is here indicated by the numeral 19, is formed in two sections, like the casing 2, but each section is substantially in the form of a sector. Each of the two portions has a bounding lateral flange 20 and the flanges of the portions are secured together by suitable bolts 21, as in the case of the circular casing.

An arcuate scale plate 22 is secured between the flanges 20 of the two sections at the arcuate side of the casing, the zero point of this scale being substantially midway between the ends thereof, as indicated at 23. The pointer 24 is pivotally secured between the walls of the two sections adjacent the constricted part thereof, as indicated generally by the numeral 25, the same mounting being employed here as described in connection with the circular level. The outer end of the pointer adjacent the scale 22 is bifurcated to receive the scale and adjacent this end there is formed an air chamber 26 while at the other end of the pointer beyond the pivot point 25 a weight 27 is mounted.

In Figure 4 the second modified form of the level is disclosed, this form consisting of a casing of substantially semicircular design, indicated as a whole by the numeral 28. As in the other forms this casing is in two sections, maintained in spaced relation by lateral walls each of which has formed integral therewith the surrounding outwardly projecting flanges 29, which flanges are held in abutting relation by screws 30.

Between the arcuate portions of the flanges 29 there is clamped a semicircular scale plate 31.

At the radial center 32 of the casing there is mounted a suitable transverse supporting shaft for maintaining in proper position a pointer 33, the mounting and shaft structure here being the same, as shown and described in connection with the preferred form.

The pointer 33 is bifurcated at its outer end to receive the inner edge of the graduated scale plate 31 and adjacent the outer end an air chamber 34 is formed while adjacent the other end beyond the pivot point 32, a weight 35 is mounted to always maintain the pointer 33 in perpendicular position.

These modified forms shown in Figures 4 and 5, are, like the preferred form, filled with a suitable liquid for damping the oscillations of the pointers and also the pointers are preferably formed of a non-magnetic metal so that extraneous magnetic influences will not effect them.

In order to keep the bearing screws 12 free from dust, dirt and corrosion, there are provided the metal caps 12$^a$ positioned over and enclosing these screws, the free edges of the caps being suitably formed to either frictionally engage or engage by screw threads or any other appropriate means the adjacent nut 11 which maintains the sleeve 9 in place.

From the foregoing description it will be readily appreciated that with a level constructed in accordance with this invention a more accurate determination of angles can be obtained and no bother will be had from the effects of temperature changes as is experienced in using an ordinary bubble level.

Having thus described my invention, what I claim is:—

1. A level of the character described, comprising a casing formed of a pair of transparent bodies having lateral abutting securing flanges, a curved graduated plate secured along one edge between said flanges and having its other edge extending into the casing, and a pointer pivotally mounted between side walls of the casing to swing over said plate.

2. A level comprising a circular casing formed in two parts each of said parts comprising a disk, a surrounding side wall and a lateral surrounding flange projecting from the wall, means for securing the flanges of the two parts together, an annular scale plate adapted to have its outer edge secured between said flanges and to project from the walls into the casing, a shaft pivotally supported at the radial center of the casing and transversely thereof, a pointer supported by said shaft, said pointer having an end bifurcated to receive the inner edge of said plate, and means for normally maintaining the pointer in vertical position.

3. A level of the character described comprising a casing formed in two parts and of transparent material, each of said parts comprising an outer wall, a side wall and a lateral flange formed integral with each side wall, the flanges of the two parts being adapted to be secured together, a scale graduated in degrees of a circle secured along one edge between said flanges and having its other edge and a portion thereof projecting into the casing, a pair of bearings mounted in opposite walls of the casing, a shaft mounted between said bearings, a pointer carried by said shaft and coacting at one end with said scale, and means carried by the pointer for normally maintaining it in vertical position.

4. A level of the character described comprising a casing formed in two parts, each of said parts comprising an outer wall, a side wall and a lateral flange formed integral with each side wall, the flanges of the two parts being in abutting relation and secured together, an annular scale graduated in degrees of a circle secured along one edge between said flanges and having its other edge and a portion thereof projecting into the casing, a pointer having pivotal connection with the outer walls of the casing and having one end disposed adjacent said scale, said casing having an outer wall transparent for viewing said scale, a non-freezing fluid within the casing, and means carried by the pointer for normally maintaining it in a vertical position and comprising a weight body mounted at one side of the pivot point and a float body mounted thereon on the other side of the pivot point from the weight body.

In testimony whereof I hereunto affix my signature.

NEWELL R. BUDGE.